United States Patent [19]

Teston

[11] 4,280,348
[45] Jul. 28, 1981

[54] AUTOMOTIVE VEHICLE WHEEL COVER LOCKING MEANS

[76] Inventor: Richard E. Teston, 28335 Gratiot, Roseville, Mich. 48066

[21] Appl. No.: 95,213

[22] Filed: Nov. 19, 1979

[51] Int. Cl.³ .......................... F16B 41/00; B60B 7/06
[52] U.S. Cl. ........................................ 70/166; 70/232; 70/258; 70/441; 70/466; 301/37 AT; 301/108 S
[58] Field of Search ................. 70/163, 164, 166–169, 70/232, 258–260, 441, 466, DIG. 34, DIG. 57, DIG. 59; 301/37 AT, 37 SC, 37 CM, 108 S, 108 SC

[56] References Cited

U.S. PATENT DOCUMENTS

| 419,324 | 1/1890 | Fish | 70/DIG. 59 X |
|---|---|---|---|
| 2,722,822 | 11/1955 | Thomas | 70/167 |
| 2,723,585 | 11/1955 | Prall | 70/166 X |
| 2,797,572 | 7/1957 | Prall | 70/258 |
| 2,874,561 | 2/1959 | Alger | 70/169 |
| 3,534,570 | 10/1970 | Mauro | 70/167 |
| 3,821,975 | 7/1974 | Haker | 70/260 X |

*Primary Examiner*—William E. Lyddane
*Attorney, Agent, or Firm*—Malcolm R. McKinnon

[57] ABSTRACT

An automotive vehicle wheel cover locking means for use in deterring the theft of wheel covers, wheels and tires and also providing protection against the loss of wheel covers due to various road hazards, the locking means including a customized lock nut cooperating with a lock stem to releasably anchor a wheel cover to a wheel lug stud, and a customized wrench for applying the lock nut to and removing the lock nut from the lock stem to lock and unlock the wheel cover.

2 Claims, 10 Drawing Figures

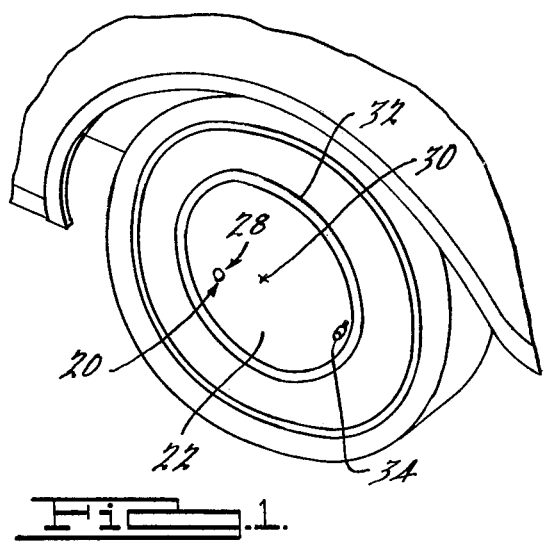
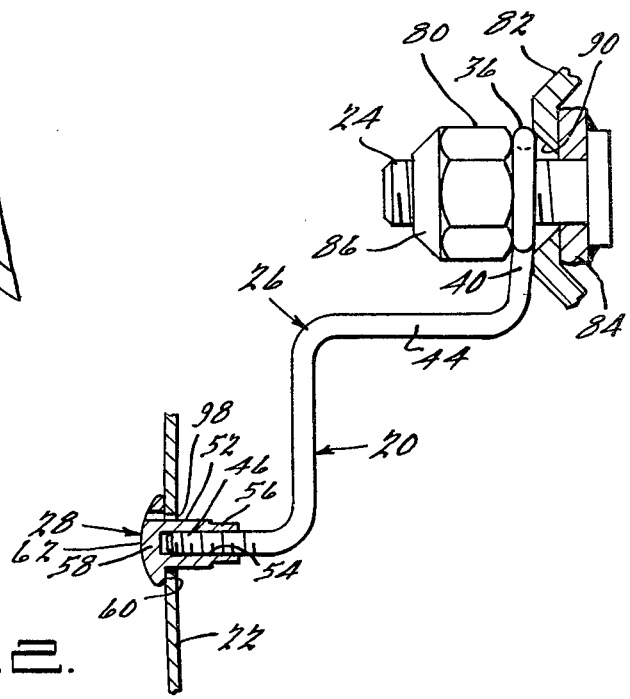
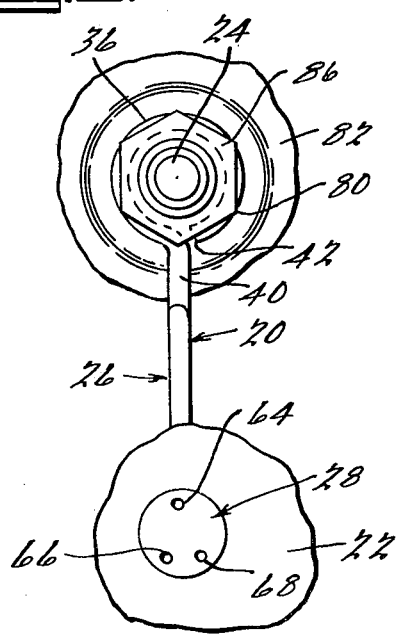
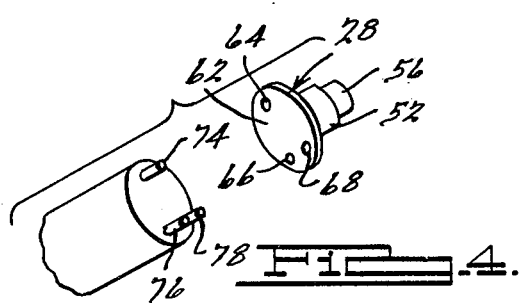
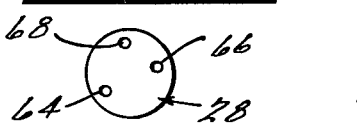
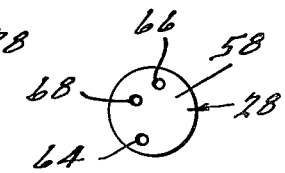

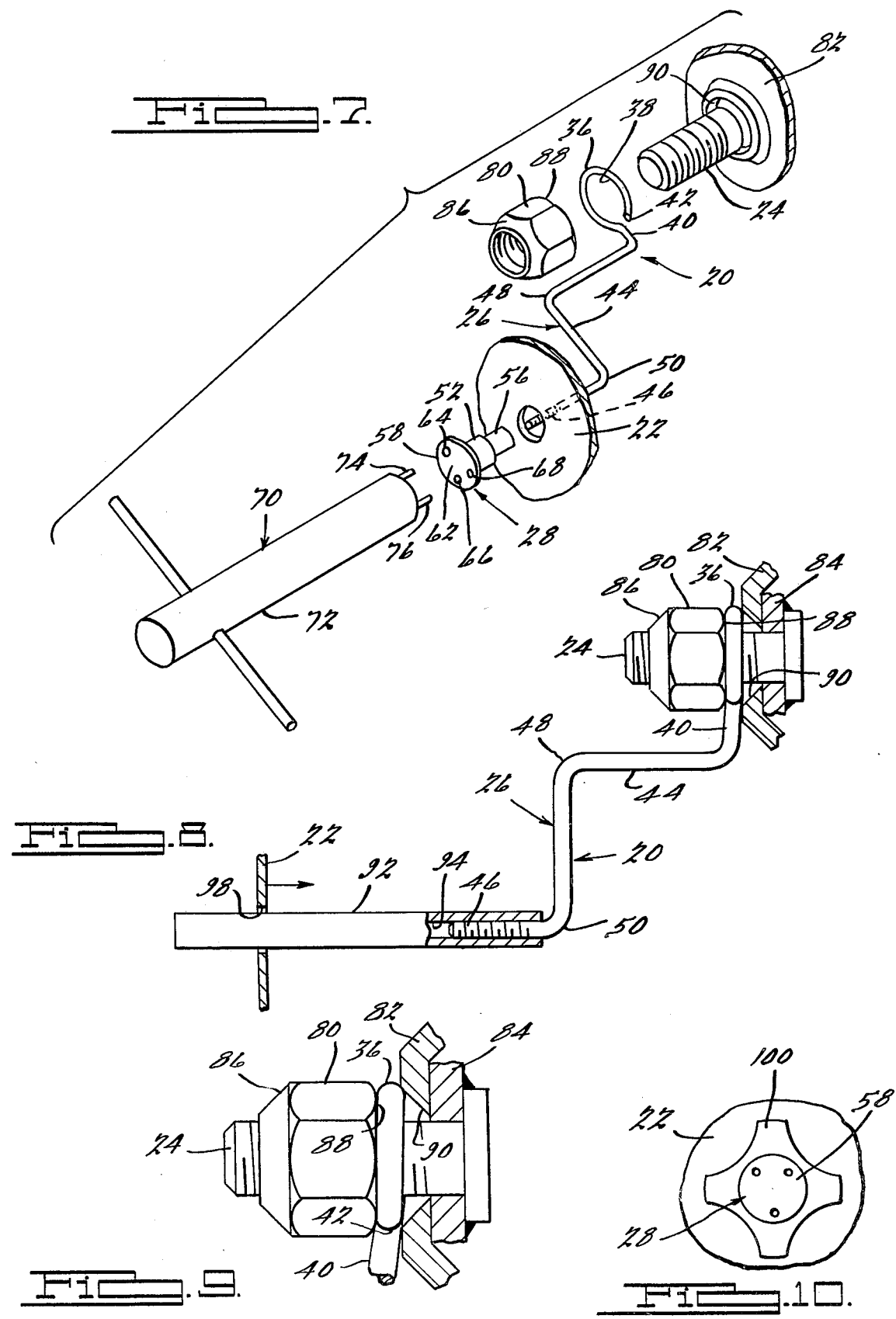

AUTOMOTIVE VEHICLE WHEEL COVER LOCKING MEANS

BRIEF SUMMARY OF THE INVENTION

This invention relates to automotive vehicle wheel cover locking means and, more particularly, to an improved wheel cover locking means particularly adapted for use in deterring the theft of automotive vehicle wheel covers, wheels and tires, and also providing protection against loss of wheel covers due to various road hazards.

As is well known in the art, automotive vehicle wheel covers are conventionally supplied on automobiles and other automotive vehicles by the manufacturers thereof for decorative purposes as well as to cover and provide protection for the hub, the lug studs, the lug nuts and the center member of the wheel, also commonly known as the disc or spider of the wheel. The wheel covers supplied by the manufacturers of the vehicles usually fit resiliently against the wheel rim and are intended to be easily removable, as for tire changing purposes, by a screw driver blade, a tire iron or other suitable tool. Since the wheel covers conventionally supplied on modern day vehicles are relatively expensive, such wheel covers have become the object of widespread theft in that all four wheel covers on on automobile, for example, can be stolen by a thief in a matter of seconds. The theft of wheels and tires has also become widespread since removal of the wheel covers provides ready access to the wheel stud nuts. It is also well known in the art that chuck holes, rocks and other road hazards can effect sufficient deflection of a wheel rim on a moving vehicle to cause a wheel cover to pop off the wheel, often without the knowledge of the vehicle driver, or under heavy traffic conditions, such as on a freeway, which prevents a driver from retrieving the wheel cover even if the driver is aware of the fact that the wheel cover has separated from the wheel.

Heretofore various devices have been provided for the purpose of locking a wheel cover to a wheel. However, prior devices of the indicated character have been subject to various deficiencies in that they are often relatively expensive, often ineffective, burdensome to install and remove, bulky, or otherwise unattractive. Additionally, such prior devices have often been easily circumvented by thieves.

An object of the present invention is to overcome the aforementioned as well as other disadvantages in prior wheel cover locking means of the indicated character and to provide an improved wheel cover locking means incorporating improved means for securing a wheel cover to a wheel to deter the theft of wheel covers, wheels and tires, and to provide protection against the accidental loss of wheel covers due to various road hazards.

Another object of the present invention is to provide an improved wheel cover locking means which is tamper resistant but which can be easily and quickly installed on and removed from a wheel cover with a minimum of time and labor by an authorized user of a vehicle.

Another object of the present invention is to provide an improved wheel cover locking means which may be customized for substantially the sole use of an authorized user of a vehicle, and which incorporates means for releasably locking a wheel stud nut on a wheel stud.

Another object of the present invention is to provide an improved wheel cover locking means which is unobtrusive and unobjectionable from an appearance standpoint.

Another object of the present invention is to provide an improved wheel cover locking means that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a perspective view of a wheel cover locking means embodying the present invention, showing the same installed on an automotive vehicle wheel cover;

FIG. 2 is an enlarged sectional elevational view of a portion of the structure illustrated in FIG. 1;

FIG. 3 is a front elevational view, with portions broken away, of the wheel cover locking means illustrated in FIG. 2;

FIG. 4 is a perspective view of a customized lock nut and a customized wrench embodying the present invention;

FIG. 5 is a front elevational view of the lock nut illustrated in FIG. 4;

FIG. 6 is a front elevational view of a lock nut illustrating the manner by which the nut may be customized with a different wrench pattern;

FIG. 7 is an exploded perspective view of the wheel cover locking means illustrated in FIG. 2, showing same in conjunction with a lug stud and lug nut and a customized wrench;

FIG. 8 is a side elevational view of the lock stem means embodying the present invention, showing the same during one step in the installation process;

FIG. 9 is an enlarged view of portions of the structure illustrated in FIG. 2; and FIG. 10 is a front elevational view of another embodiment of the invention.

DETAILED DESCRIPTION

Referring to the drawings, a preferred embodiment of the invention is illustrated in FIGS. 1 through 9 thereof, and is comprised of a wheel cover locking means, generally designated 20, which is intended for use in releasably anchoring an automotive vehicle wheel cover 22 to a wheel lug stud 24 to deter the theft of the wheel cover and associated wheel and tire, and to provide protection against the loss of the wheel cover due to various road hazards. It will be understood however that the present invention is applicable to other uses. The wheel cover locking means 20 is comprised of a lock stem, generally designated 26, and a customized lock nut, generally designated 28, which cooperate to releasably lock the wheel cover 22 to the conventional lug stud 24. As shown in FIG. 1, the wheel cover locking means 20 is preferably installed on the wheel cover 22 at a position between the center 30 of the wheel cover and the rim 32 of the wheel cover and also preferably in the general area of the wheel cover which is approximately diametrically opposed and remote from the conventional valve stem 34.

The lock stem 26 is preferably fabricated from stainless steel or other corrosive resistant material having sufficient strength to withstand the forces that may be exerted thereon. It is also preferred that the lock stem 26 have a hardness greater than that of the material from which the vehicle wheel is fabricated. As shown in the drawings, the lock stem 26 includes an annular base portion 36 of generally split ring configuration and defining a generally circular opening 38 adapted to receive the conventional externally threaded lug stud 24 with a sliding fit. The lock stem 26 also includes an integral coplanar tang portion 40 which projects radially outwardly from the split ring shaped annular base portion 36 in spaced relationship with respect to the free end 42 of the split ring annular base portion, the tang portion 40 in turn being integrally joined with an intermediate leg portion 44 which extends in a direction generally perpendicular to the annular base portion 36 and which terminates in an externally threaded shank portion 46. In the preferred embodiment of the invention illustrated, the intermediate leg portion 44 is shown with two right angle bends or knees 48 and 50 which faciliate positioning the externally threaded shank portion 46 so that the shank portion 46 will intersect the wheel cover 22 at a desired predetermined location depending upon the particular design and configuration of the wheel cover. It will be understood that in some instances the intermediate leg portion 44 may extend in a straight line between the tang portion 40 and the wheel cover 22 or that the angles of the knees 48 and 50 and the segmental lengths of the leg portion 44 adjacent the knees may vary depending on the particular design and configuration of the wheel cover as determined by the manufacturer thereof.

The lock nut 28 includes a tubular body portion 52 which defines an internally threaded blind bore 54 that is adapted to receive and threadably engage the externally threaded shank portion 46 of the lock stem 26. If desired, the tubular body portion 52 may be reduced in diameter, as at 56, to provide a pilot for the lock nut 28. The lock nut 28, which is also preferably formed of stainless steel or other corrosive resistant material having sufficient strength to withstand the forces that may be exerted thereon, includes the internally threaded tubular body portion 52, as previously mentioned, and also includes a circular head 58 having a flat surface 60 adapted to abut the outer surface of the wheel cover 22, and a convex outer surface 62 which blends with the flat surface 60 at the periphery of the head with a substantially feather edge. The head 58 of the lock nut 28 is provided with a plurality of spaced passageways 64, 66 and 68 as shown, for example, in FIGS. 3, 4, 5 and 6. In the preferred embodiment of the invention illustrated, three passageways 64, 66 and 68 are provided although it will be understood that a greater or less number of passageways may be utilized if desired. The passageways 64, 66 and 68 are disposed in a predetermined pattern, which pattern is randomly varied for different vehicles. A T-handled customized wrench, generally designated 70, is provided for installing the lock nut on and removing the lock nut from the lock stem 26, the customized wrench 70 including a body portion 72 carrying three axially extending pins 74, 76 and 78 so arranged that the pins 74, 76 and 78 are precisely aligned with and insertable in the spaced passageways 64, 66 and 68, respectively, provided in the lock nut head 58 as illustrated in FIGS. 4 and 7. It will be understood that the wheel cover locking means 20 for a particular vehicle will preferably be provided with, for example, four lock nuts each having the same configuration of spaced passageways in the lock nut head and with a customized wrench 70 carrying pins 74, 76 and 78 arranged in a configuration corresponding with the configuration of passageways of the associated lock nuts. It will be understood that the pattern of the passageways and associated pins on the customized wrench will vary from vehicle to vehicle so that a single wrench 70 can be used only with its associated lock nuts and will not fit the lock nuts with a different passageway pattern installed on other vehicles, such as illustrated in FIG. 6.

In the installation of the wheel cover locking means 20, the wheel cover 22 is initially removed from the wheel rim, and one of the conventional lug nuts 80 which serves to secure the wheel 82 to the brake drum 84 through the agency of the associated lug stud 24 is removed. As is well known in the art, conventional lug nuts have a tapered end portion 86 at one end thereof and a substantially flat surface 88 at the opposite end thereof, the tapered end portion 86 being adapted to fit in a tapered opening 90 provided in the wheel 82 when the lug nut 80 is utilized in the conventional manner. After the selected lug nut 80 is removed from the associated lug stud 24, the annular base portion 36 of the lock stem 26 is then slideably circumposed on the lug stud and clamped in place between the flat end 88 of the lug nut and the wheel 82. In other words, the lug nut is inverted from its conventional position on the lug stud so that the flat end 88 of the lug nut, as distinguished from the tapered end portion 86 of the lug nut, bears against the annular base portion 36 of the lock stem 26. The selected lug nut is initially tightened only finger tight with torque sufficient to cause the flat end 88 of the lug nut to abut the annular base portion 36 of the lock stem 26.

In accordance with the present invention, a cylindrical guide tube 92 is provided defining an internal passageway 94 adapted to receive with a sliding fit the externally threaded shank portion 46 of the lock stem 26, the guide tube 92 preferably being formed of metal. FIG. 8 illustrates the manner by which the guide tube 92 is utilized to align the externally threaded shank portion 46 of the lock stem 26 with a small, specially prepared hole 98 that is drilled or otherwise formed in the wheel cover at the desired location, the hole 98 having a diameter such that the body portion 52 of the lock nut 28 may be inserted therein with a sliding fit. After the externally threaded shank portion 46 of the lock stem 26 is properly aligned with the hole 98 in the wheel cover, the wheel cover 22 is again removed from the rim of the wheel and the lug nut 80 is firmly tightened on the associated lug stud 24 with a conventional tire iron wrench or other suitable tool with care being taken that the lock stem 26 is not displaced from its aligned position. When the lug nut is so tightened against the annular base 36 of the lock stem 26, the annular base portion 36 is forced slightly into the tapered opening 90 provided in the wheel with the result that the end 42 of the annular base portion 36 cocks slightly and the edge thereof tends to bite into the flat surface 88 of the lug nut to provide a locking action which prevents the lug nut 80 from backing off of the lug stud 24. Such locking action may, of course, be overcome by exerting torque on the lug nut through the agency of a wrench or other suitable tool. At the same time that the annular base portion 36 is slightly deflected, the tang portion 40 bites into the edge of the wheel defining the periphery of the tapered opening 90 a distance sufficient to prevent rotation of the lock stem 26 relative to the lug stud.

After the lug nut 80 has been tightened against the annular base portion 36 of the lock stem, the wheel cover 22 is reinstalled and the guide rod 92 is removed thereby exposing the shank portion 46 of the lock stem which is disposed at a position aligned with the opening 98 in the wheel cover. The lock nut 28 is then threadably engaged with the shank portion 46 of the lock stem through the agency of the customized wrench 70 by inserting the pins 74, 76 and 78 of the wrench in the passageways 64, 66 and 68 provided in the head of the lock nut and applying torque to the wrench so as to tighten the flat surface 60 of the head of the lock nut against the outer surface of the wheel cover 22. The head 58 of the lock nut 28 may have, for example, a diameter of approximately one-half inch and a thickness of approximately one-eighth inch, and it will be understood that as a result of the combination of the feathered edge at the periphery of the head of the lock nut and the predetermined pattern of the spaced passageways 64, 66 and 68 provided in the head of the lock nut, that the head of the lock nut when properly installed on the wheel cover will be nearly flush with the outer surface of the wheel cover and difficult to remove using conventional tools such as pliers, screwdrivers and the like. At the same time, since the head of the lock nut is relatively small, it is unobtrusive when installed on the wheel cover and does not detract from the general appearance of the wheel cover while protecting against theft of the wheel cover and loss of the wheel cover due to hazardous road conditions.

Another embodiment of the invention is illustrated in FIG. 10. Some vehicle owners may wish to call attention to the fact that their wheel covers are protected by the wheel cover locking means 20 thereby discouraging even attempted theft thereof, and FIG. 10 depicts the manner by which a brightly colored washer 100 may be positioned between the head 58 of the lock nut and the outer surface of the wheel cover 22 thereby effectively framing the head 58 of the lock nut. The colored washer 100 may be made of any desired or conventional material which is corrosive resistant, such as a color impregnated plastic or anodized aluminum, and may be of any desired shape and size which will attract the attention of potential thieves and apprise them of the fact that the wheel covers are protected by wheel cover locking means.

From the foregoing, it will be apparent that the installation of the wheel cover locking means 20 does not require the removal of the wheel assembly from the vehicle nor hoisting of the vehicle, and does not require the use of expensive tools or that the user be possessed of exceptional mechanical ability.

While preferred embodiments of the invention have been illustrated and described, it will be understood that various changes and modifications may be made without departing from the spirit of the invention.

What is claimed is:

1. An automotive vehicle wheel cover locking means comprising, in combination, a lock stem including a single annular base portion of split ring configuration and defining an opening adapted to receive a conventional wheel lug stud, said lock stem also including an integral tang portion projecting radially outwardly from said base portion and an integral leg portion extending in a direction generally perpendicular to said base portion and terminating in an externally threaded shank portion, and a lock nut having a tubular body portion defining an internally threaded blind bore adapted to receive and threadably engage said shank portion of said lock stem, said lock nut also including an integral head portion having an inner surface adapted to abut the outer surface of a wheel cover and a convex outer surface blending smoothly with said inner surface at the periphery of said head portion, said head portion defining a plurality of axially extending passageways intersecting said convex surface in a predetermined pattern.

2. In combination with an automotive vehicle wheel cover having an outer wall defining an opening, lock means for releasably anchoring said wheel cover to a wheel lug stud, said lock means including a lock stem having a single annular base portion of split ring configuration and defining an opening adapted to receive said wheel lug stud, said lock stem also including an integral tang portion projecting radially outwardly from said base portion and an integral leg portion extending in a direction generally perpendicular to said base portion, said leg portion terminating in an integral externally threaded shank portion, and a lock nut having a tubular body portion having a sliding fit in the opening defined by said wall of said wheel cover, said body portion of said lock nut defining an internally threaded blind bore adapted to receive and threadably engage said shank portion of said lock stem, said lock nut also including an integral head portion having a flat surface adapted to abut the outer surface of said wall of said wheel cover and a convex outer surface blending smoothly with said flat surface at the periphery of said head portion, said head portion defining a plurality of axially extending passageways intersecting said convex surface in a predetermined pattern.

* * * * *